United States Patent [19]
Pryor et al.

[11] Patent Number: 5,925,258
[45] Date of Patent: Jul. 20, 1999

[54] UPRIGHT TUBULAR FILTER UNIT AND METHOD OF SEPARATION USING THE FILTER UNIT

[75] Inventors: Martin John Pryor, New Germany; Kevin Treffry-Goatley, Gillitts, both of South Africa

[73] Assignee: Water Research Commission, Pretoria, South Africa

[21] Appl. No.: 08/674,566

[22] Filed: Jul. 5, 1996

[30] Foreign Application Priority Data

Jul. 5, 1995 [ZA] South Africa ............................ 95/5584

[51] Int. Cl.⁶ ............................ B01D 37/00; B01D 29/82
[52] U.S. Cl. ........................ 210/770; 210/791; 210/783; 210/350; 210/400; 210/323.2; 210/332; 210/472; 100/121
[58] Field of Search .................................. 210/767, 770, 210/780, 783, 791, 472, 800, 806, 808, 332, 323.2, 350, 400; 100/121

[56] References Cited

U.S. PATENT DOCUMENTS

| Re. 35,559 | 7/1997 | Lagreca | 210/323.2 |
| 506,127 | 10/1893 | Malhiot | 210/323.2 |
| 5,158,672 | 10/1992 | Lagreca | 210/323.2 |
| 5,350,526 | 9/1994 | Sharkey et al. | 210/323.2 |

FOREIGN PATENT DOCUMENTS

| 861834 | 3/1986 | South Africa . |
| 870553 | 1/1987 | South Africa . |

*Primary Examiner*—Robert J. Popovics
*Attorney, Agent, or Firm*—Birch, Stewart, Kolasch & Birch, LLP

[57] ABSTRACT

A method of separating particulate material suspended in a liquid from that liquid is described. The method includes the steps of: providing at least one upright tubular filter unit having a top end and a lower end; introducing a flow of the suspension into the tubular filter unit at one end thereof; and allowing the suspension to pass through the tubular filter unit trapping particulate material on an inside surface thereof. Apparatus in which the method of the invention is performed is also described.

10 Claims, 1 Drawing Sheet

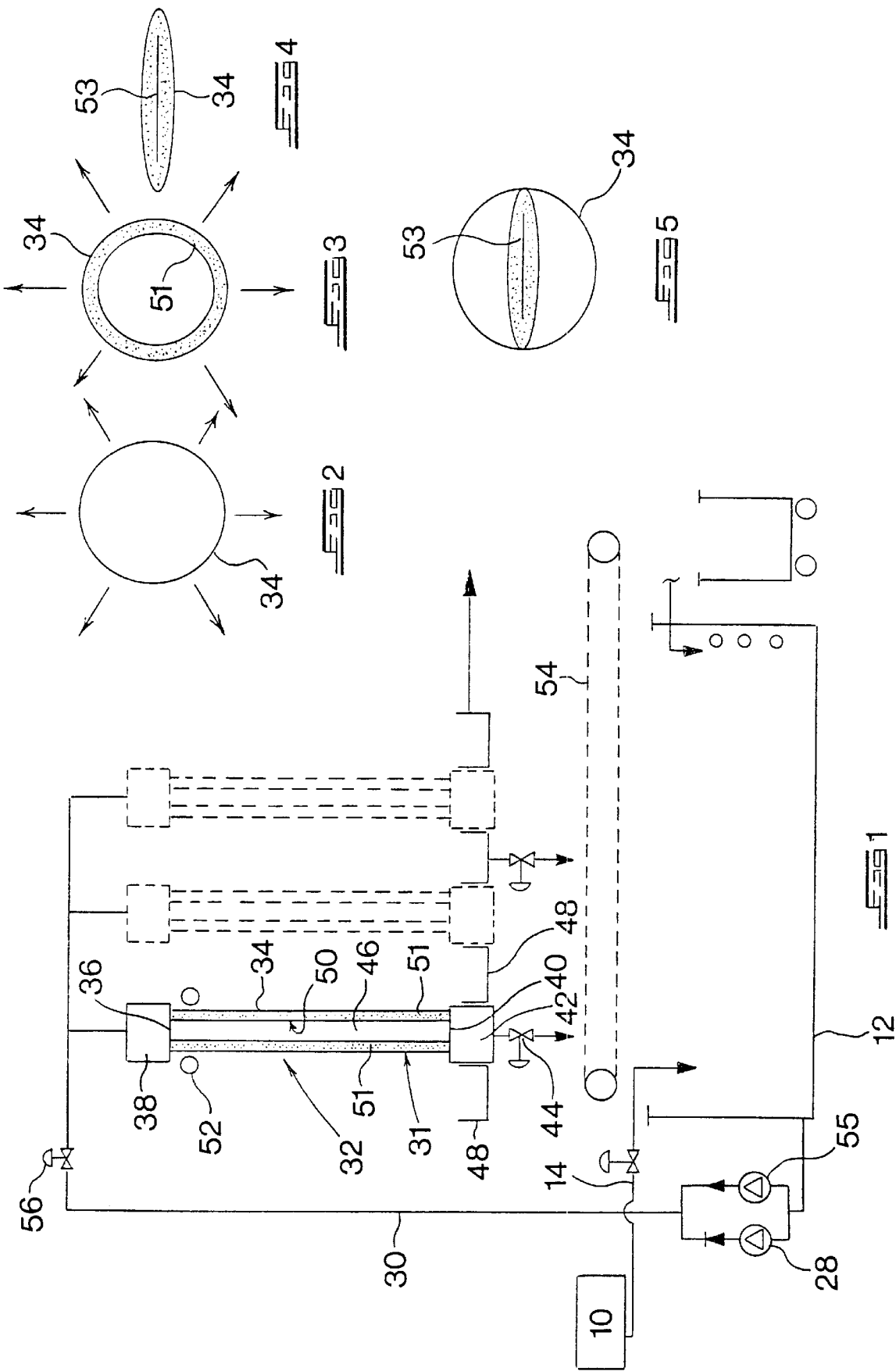

UPRIGHT TUBULAR FILTER UNIT AND METHOD OF SEPARATION USING THE FILTER UNIT

BACKGROUND OF THE INVENTION

This invention relates to an upright tubular filter unit and a method of separation using the filter unit.

Separation by filtration is a widely used technique for separating particulate solids suspended in a liquid medium from that liquid medium. It has particular application to water purification.

Filtration can make use of various filtration mediums such as sand, fabrics, paper or the like. One such medium is a filter tube wherein the suspension is introduced into the inside of the tube and the liquid forced outwards trapping particulate material on the inside surface of the tube. Banks of tubes may be employed. It is the practice to employ such tubes in a horizontal, or essentially horizontal disposition.

SUMMARY OF THE INVENTION

According to one aspect of the present invention, a method of separating particulate material suspended in a liquid from that liquid, includes the steps of:

providing at least one upright tubular filter unit having a top end and a lower end;

introducing a flow of the suspension into the tubular filter unit at one end thereof; and allowing the suspension to pass through the tubular filter unit trapping particulate material on an inside surface thereof.

The method may also include the step of collecting clarified liquid, from which the particulate material has been separated, on an outside surface of the tubular filter unit.

The liquid suspension is preferably introduced into the top end of the tubular filter unit.

The suspension may be caused to pass downwards in the tubular filter unit under the influence of gravity.

The method may also include the step of removing the particulate material trapped on the inside surface of the tubular filter unit.

The tubular filter unit preferably comprises a flexible sidewall.

The step of removing the particulate material may comprise the steps of:

stopping or reducing the flow of the suspension into the tubular filter unit; and venting the interior of the tubular filter unit of liquid which causes the flexible sidewall of the tubular filter unit to deform which causes removal of at least a portion of the trapped particulate material.

Preferably, the top end of the upright tubular filter unit is sealed or near sealed.

Preferably, the interior of the tubular filter unit is sufficiently vented to generate at least a partial vacuum in the interior of the tubular filter unit.

The deformation of the tubular filter unit is preferably a flattening of the flexible sidewall thereof under the internal vacuum which compresses the trapped particulate material into a flattened cake.

The step of removing the trapped particulate material may also comprise the step of introducing a fresh flow of suspension into the vented tubular filter unit.

The fresh flow of suspension is preferably introduced into the top end of the vented tubular filter unit.

The fresh flow of suspension may comprise at least a single pulsed flow of suspension. More preferably, it comprises from one to four pulsed flows of suspension.

According to another aspect of the invention, apparatus is provided for separating particulate material suspended in a liquid from that liquid and it comprises at least one upright tubular filter unit having a top end and a lower end, means to close the top end thereof.

The means to close the top end of the filter unit is preferably a valve.

The apparatus may also comprise means to close the lower end of the tubular filter unit, which may also be a valve.

The apparatus may comprise at least two adjacent upright tubular filter units.

BRIEF DESCRIPTION OF THE DRAWINGS

The invention will now be described in more detail, by way of example only, with reference to the accompanying drawings in which:

FIG. 1 is a flow diagram showing a process of the invention and apparatus for performing the process of the invention;

FIG. 2 is a cross sectional view through an expanded tubular filter unit under internally applied pressure from suspension flowing through it before particulate material is trapped on an inside surface thereof;

FIG. 3 is a cross sectional view through a tubular filter unit after particulate material has been trapped on an inside surface thereof;

FIG. 4 is a cross sectional view of a collapsed tubular filter of FIG. 3 after a vacuum has been applied to the inside thereof and shows a flattened filter cake; and FIG. 5 is a cross sectional view through a tubular filter unit of FIG. 4, the sides of which have been expanded away from the flattened filter cake by a pulsed flow of suspension through the tubular filter unit.

DETAILED DESCRIPTION OF THE INVENTION

A method of separating particulate material suspended in a liquid suspension from that liquid suspension is described. The method involves utilising at least one, but typically a bank of, upright tubular filter units, each having a top end and a lower end. A flow of suspension is introduced into the top end of each tubular filter unit and allowed to pass through the filter unit, trapping the particulate material on an inside surface of the filter unit. It is a crucial feature of the method and apparatus of this invention that each tubular filter unit is an upright unit. Each filter unit may be arranged or disposed vertically or near vertically.

The upright arrangement or disposition of each filter unit, it has been found, has a number of advantages. It allows for efficient filtration by promoting a good flow of the suspension through each filter unit under the influence of gravity. It allows for the efficient venting of each tubular filter unit so that a vacuum can be created in the interior of each filter unit which, as discussed more fully below, greatly facilitates the removal of the trapped particulate materials from the tubular filter units. It has also been found that the upright arrangement of the tubes in the present invention facilitates the collapse of the tube under vacuum whereas in a horizontal arrangement or disposition of tubes, such a collapse under a vacuum would be difficult to achieve.

The method of the invention essentially involves a combination of three steps which are effected sequentially to remove particulate matter in the form of a filter cake which is trapped on the inside surface of the tubular filter unit.

These three steps comprise a deformation of the sidewall of the filter tube before and during the entrapment and deposition of the filter cake on it, venting of the tubular filter unit and the generation of a vacuum within it to cause the cake and filter tube to collapse inwards and form a flattened layer of filter cake, and lastly, a dislodgement from the inner surface of the tubular filter unit of the trapped flattened filter cake, by means of a pulse or pulses of suspension to blow out the sidewall of the filter tube.

The method and apparatus of the invention will now be described in more detail with reference to the attached figures.

A sludge or slurry, which contains particulate material suspended therein and is therefore a liquid suspension, to be dewatered is fed from a source 10 into a feed tank 12 along a line 14. It is pumped through pressure pump 28, along a line 30 and into a bank 32 of upright tubular filter units. There may be a plurality of banks, as shown by the dotted lines, into which the suspension is pumped. Only one upright tubular filter unit 31 of the bank is actually shown in the drawing. Each tubular unit 31 has a top end 36 mounted in a supporting manifold 38 and a lower end 40 also mounted in a supporting manifold 42. The top end is closable by a valve 56 and the lower end is closable by a valve 44. If the pump used is a so-called rotating cavity pump, for example a MONO® pump, then the flow of suspension into each upright tubular filter unit may be stopped without the need to have a valve 56 closing the top end of the or each upright tubular filter unit.

The suspension is fed along the line 30 under the force of the pumps into the top end 36 of each upright tubular filter unit 31, which is closed at the lower end by the valve 44. It fills the inside 46 of the tubular filter unit 31. This causes the flexible sidewall of the tubular filter unit to open out and to expand and to assume a generally circular configuration, as shown in FIG. 2. As the pressure inside the tubular filter unit increases, the flexible sidewall of the tubular filter unit stretches slightly laterally and also elongates and the particulate material is trapped and deposited while it is in this elongate state. As the lower end 40 of the tubular filter unit is closed by the valve 44, the liquid in the suspension is forced out through the porous sidewall of the tubular filter unit thereby filtering and clarifying it. The clarified liquid runs down the exterior surface of the tubular filter unit and is collected in the trays 48 located alongside each tubular filter unit or bank of tubular filter units for use or for further processing.

Each tubular filter unit has a flexible sidewall 34 made of a sufficiently flexible material so that the filter unit collapses when it is vented or emptied of liquid, as discussed more fully below. The suitable flexible material may be paper, a textile or another fabric of natural or man-made origin. The material must be liquid permeable and its pores should be sufficiently small to capture the particulate matter.

The particulate matter in the suspension is trapped in and on the inside surface 50 of the flexible sidewall of each tubular filter unit. This causes a filter cake layer to build up, as a cylindrical filter cake tube 51, on the inside surface of the flexible wall of the tubular filter unit, as shown in FIG. 3. This filter cake layer must be dislodged and removed from time to time to prevent the tubular filter unit from fouling completely and clogging or blocking and becoming ineffective or ceasing to operate.

It is removed by first closing the valve 56 to stop the pressurised flow of the suspension into the or each tubular filter unit. The valve 44 at the lower end 40 of the tubular filter unit is then opened, causing the interior of the or each tubular filter unit to be vented quickly and more or less completely of liquid within it. This rapid or sudden venting causes a vacuum to develop within the tubular filter unit and within the cylindrical filter cake tube. This vacuum causes the flexible sidewall of the tubular filter unit to be sucked in and flattened. It also causes the trapped, cohesive filter cake tube 51 to collapse in on itself and to be compressed into a flattened cake 53 sandwiched within the flattened tubular filter unit, as shown in FIG. 4. The force of the vacuum and the external pressure of the flattened sidewall of the tubular filter unit causes internal bonding of the cake layer. Because of the generation of the vacuum, air may be drawn in along the length of the filter tube further dislodging the cake from the interior of the or each tubular filter unit.

The sudden reduction of pressure within the tubular filter unit also causes the flexible sidewall to shrink rapidly, particularly lengthwise, and thus deform. This assists in the dislodgement of the trapped filter cake layer from the inside surface of the tubular sidewall because a shearing occurs between the inside surface of the sidewall of the tubular filter unit and the tubular filter cake thereby dislodging the tubular filter cake from the inside surface of the filter tube.

The flattened, dislodged filter cake layer is then removed from the inside of the tubular filter unit by opening the valve 56 and introducing a fresh flow of suspension into the, now flattened, vented tubular filter unit in from one to four pressurised pulsed flows of suspension. This impacts the upper side of the flattened filter cake and causes the suspension to flow around the sides of the flattened dislodged filter cake thereby blowing out the flexible sidewall of the tubular filter unit, so that it again assumes a more or less tubular profile, as shown in FIG. 5, and allowing the flattened dislodged filter cake to be removed or scoured from the inside of the tubular filter unit relatively easily. This is called pulse cleaning or pulse scouring.

The pressurised pulsed flows of suspension through the interior of the tubular filter unit are produced by starting the flush pump 55 with the valve 56 closed and then opening and closing the valve 56 a corresponding number of times to produce the desired number of pressurised pulsed flows through the or each tubular filter unit. If the filler cake layer is sufficiently thick, a single pulsed layer will usually dislodge it.

Although the method of the invention works sufficiently well without requiring any additional cake dislodgement means, other cake dislodgement and removal methods may be used in conjunction with the method described. Such removal methods usually involve some externally applied pressure, typically a constrictive pressure. One of these involves the positioning of a pair of rollers 52 alongside the exterior of each tubular filter unit. The rollers can be caused to move inwards to squeeze the sidewall of each tubular filter unit to deform or further deform it to dislodge or to assist in the dislodgement of the cake from the sidewall. The rollers are moved down the entire length of the sidewall of the tubular filter unit to assist in squeezing the particulate matter out of the lower end of the tubular filter unit. The rollers are then reversed to their rest position, as shown in FIG. 1, and the filter unit is ready for a further filtration or particulate material removal cycle.

The dislodged cake falls onto a conveyor belt 54 which is perforated in order to allow the liquid in any dislodged cake and from the pulsed flows to drain away while the cake remains on the surface of the belt. The liquid passes through the belt and is collected in the feed tank 12 for recycle.

The method and apparatus of the invention have particular application to the purification of water or effluent and to the de-watering of sludges. The method and apparatus of the invention have been found to be particularly suitable for de-watering water works and industrial and mining sludge, which contain up to 5 to 50 g/l solids, to produce a cake of 15 to 35% solids. The method and apparatus may also be used to clarify turbid waters to produce a clarified water which is suitable for human consumption or to clarify industrial effluents prior to sewer discharge or further use of the effluent material.

The method of the invention will now be described with reference to the following illustrative example.

Apparatus containing an array of twenty eight, substantially parallel, upright tubular filter units each having a diameter of about 65 mm and a length of about 2300 mm is provided. Each filter tube is made from twill woven polyester.

A suspension in the form of a waterworks sludge having a solids concentration of about 10 to 30 g/l, and on average 24 g/l, is introduced into the top of each filter tube. The sludge is fed to each tubular filter unit, after it has been closed at the lower end thereof, at a pressure of about 300 kPa for a time period of about 30 minutes.

The sludge feed to each filter unit is then shut off and each filter unit is then vented. Three separate pulsed flows of fresh sludge are then introduced into each filter tube at a flow rate of about 6 m$^3$ per hour for a period of about 5 seconds per pulse.

It was found that the tubes were completely cleaned and that 85 kg of cake was removed from the twenty eight tubes. The cake was measured to have a solids concentration of 31% m/m.

We claim:

1. A method of separating particulate material suspended in a liquid from that liquid, including the steps of:

providing at least one upright tubular filter unit having a top end and a lower end;

closing an end of the filter unit during filtration;

introducing a flow of the suspension into the tubular filter unit at one end thereof;

allowing the suspension to pass through the tubular filter unit trapping particulate material on an inside surface thereof;

stopping or reducing the flow of suspension into the tubular filter unit; and sufficiently venting the interior of the tubular filter unit of liquid by opening the lower end of the tubular filter unit to generate at least a partial vacuum in the interior of the tubular filter unit, thereby removing at least a portion of the trapped particulate material.

2. The method according to claim 1, also including the step of collecting clarified liquid, from which the particulate material has been separated, on an outside surface of the tubular filter unit.

3. The method according to claim 1, wherein the liquid suspension is introduced into the top end of the tubular filter unit.

4. The method according to claim 1, wherein the suspension is caused to pass downwards in the tubular filter unit under the influence of gravity.

5. The method according to claim 1, wherein the tubular filter unit comprises a flexible sidewall.

6. The method according to claim 5, wherein the top end of the tubular filter unit is at least partially sealed during venting of the interior of the tubular filter unit of liquid.

7. The method according to claim 6, wherein the top end of the tubular filter unit is completely sealed.

8. The method according to claim 7, wherein the partial vacuum in the interior of the tubular filter unit causes a flattening of the flexible sidewall thereof under the vacuum which compresses the trapped particulate material into a flattened cake.

9. The method according to claim 8, wherein the step of removing the trapped particulate material also comprises the step introducing a fresh flow of suspension into the vented tubular filter unit.

10. The method according to claim 9, wherein the fresh flow of suspension comprises at least a single pulsed flow of suspension.

* * * * *